United States Patent
Shaffer

[11] 3,919,090
[45] Nov. 11, 1975

[54] SURFACE SKIMMING SYSTEM
[75] Inventor: Robert L. Shaffer, Olathe, Kans.
[73] Assignee: Ecodyne Corporation, Lincolnshire, Ill.
[22] Filed: Sept. 11, 1974
[21] Appl. No.: 505,193

[52] U.S. Cl. ............................. 210/523; 210/525
[51] Int. Cl.² ....................................... B01D 21/06
[58] Field of Search ................ 209/169, 172, 173; 210/523–531

[56] References Cited
UNITED STATES PATENTS

| | | | |
|---|---|---|---|
| 2,611,489 | 9/1952 | Scott | 210/528 |
| 2,707,560 | 5/1955 | McRae et al. | 210/523 |
| 2,822,928 | 2/1958 | Wormser et al. | 210/523 |
| 2,876,863 | 3/1959 | Kivari | 210/525 X |
| 3,465,887 | 9/1969 | Cookney | 210/528 X |
| 3,627,132 | 12/1971 | Kelly et al. | 210/525 X |
| 3,820,659 | 6/1974 | Parlette | 210/525 X |

Primary Examiner—John Adee
Assistant Examiner—Robert H. Spitzer
Attorney, Agent, or Firm—Joel E. Siegel; Charles M. Kaplan

[57] ABSTRACT

A surface skimming system for collecting and removing floating matter from the surface of a circular clarifier. The system includes a rotating skimmer arm, a scum blade and pocket assembly, and a scum baffle. The scum blade and pocket assembly are secured to the outer end of the skimming arm for receiving and directing the outwardly moving floating matter into the scum baffle. The scum baffle is located adjacent the outer periphery of the clarifier tank and includes a scum beach and trough assembly to receive the floating matter collected in the scum pocket. A pair of scum blades are positioned adjacent one another in an overlapping relationship and are independently biased against the side walls of the scum baffle by flexible support members. The flexible support members are in turn secured to the skimmer arm through a torsion bar so as to permit vertical movement of the scum blades while maintaining a downward bias thereon as they move along the scum beach.

13 Claims, 2 Drawing Figures

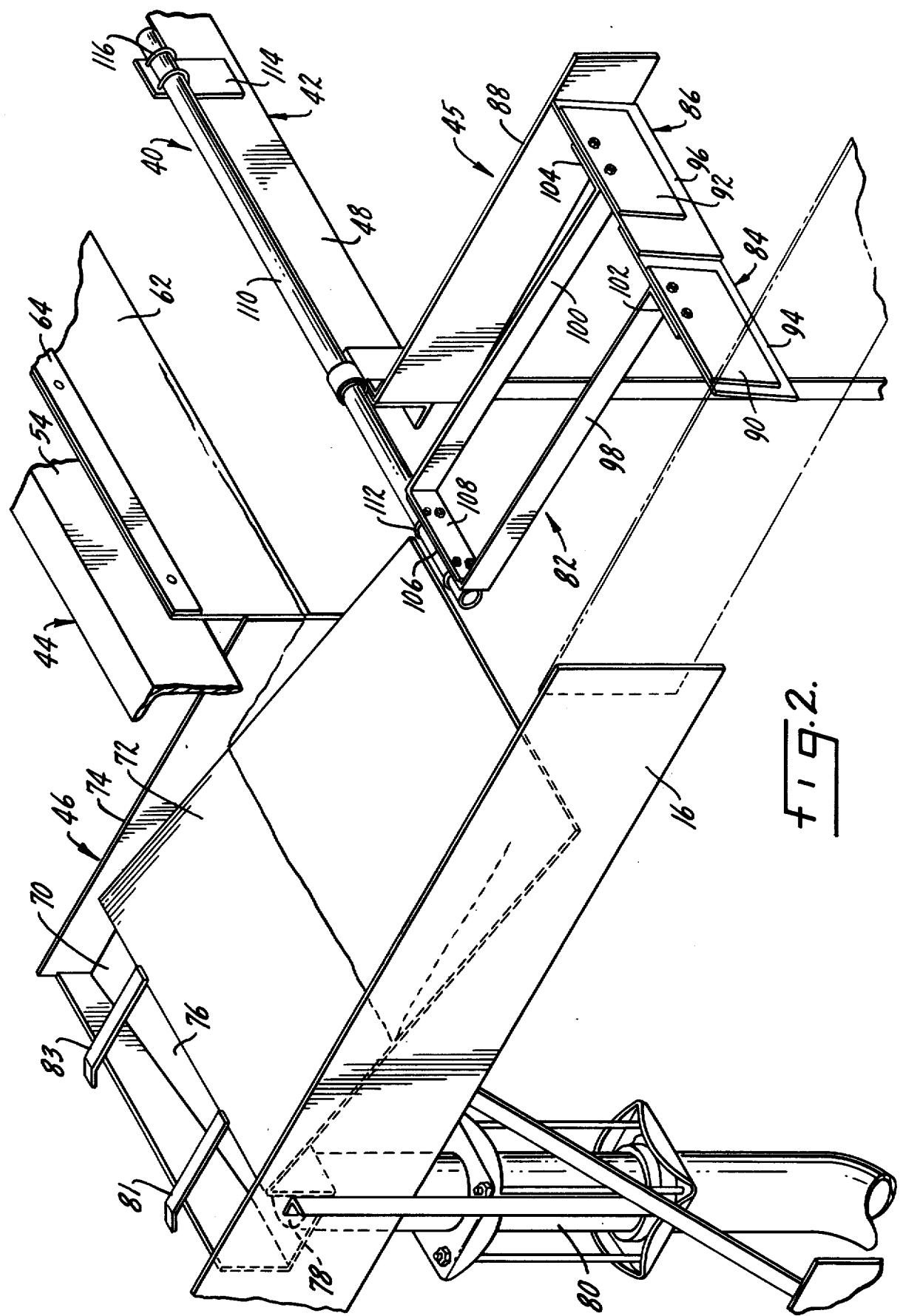

3,919,090

SURFACE SKIMMING SYSTEM

BACKGROUND OF THE INVENTION

This invention relates to a surface skimming system for circular clarifiers which collects and removes floating matter from the surface of the clarifier. It deals specifically with the discharge of the collected floating matter from the clarifier tank.

In a typical sewage or industrial waste treatment system, a clarifier tank normally defines one stage in a multi-stage treatment operation. The clarifier tank receives a "mixed liquor" from an initial stage aeration tank. Solids are separated from the liquid by settling in the clarifier, and the liquid is removed as effluent from the system and disposed of. Sludge comprising the accumulated solids is ordinarily removed for use in the next aeration stage of the sewage treatment.

As the solids separate from the effluent by settling in the clarifier tank, very light solids tend to float to the top of the liquid and form a scum on its surface. While this portion of floating matter is small, it creates an unsightly and smelly mess if allowed to accumulate. This scum, therefore, must be collected from the liquid surface and discharged from the tank. It is well known to use a scum baffle arrangement to contain the scum which has a tendency to flow over the effluent weir and contaminate the discharge effluent.

A number of surface skimming systems have been heretofore devised to solve this problem. Virtually all of the collection systems incorporate a slowly rotating arm which sweeps the surface of the clarifier. Most of these systems also utilize a scum blade and pocket assembly attached to the outer end of the rotating arm to hold and discharge the floating scum into a fixed scum trough. The conventional scum pocket assembly collection system has been heavy, complicated of design and construction, and prone to poor performance. Immediately prior to the discharge of material from the pocket assembly into the scum trough, it is critical that the bottom of the blade seal against a scum beach leading up to the scum trough and the respective edges of the blade seal against the pocket side and the scum baffle wall. The edge seals have normally been a piece of neoprene which may be forced against the scum baffle by an elaborate coil spring loaded mechanism. The seal at the opposite side of the scum pocket is not free to act independently of the scum baffle seal. The opposite side seal is then ineffective, particularly after some wear has occurred on the neoprene. The bottom seal has also been a piece of neoprene. The sealing pressure has normally been provided by either gross weight of steel on a pivoting mechanism, or an elaborate coil spring loaded mechanism. The neoprene seal is subject to wear and deterioration and the mechanism is complicated, heavy, and expensive.

SUMMARY OF THE INVENTION

Accordingly, it is a primary object of the present invention to provide a simple, economical, and positive means of removing collected floating matter from the surface of a circular clarifier.

Another object is to provide a surface skimming discharge system that incorporates a unique scum blade and pocket assembly which provides independent sealing action of the respective ends of the scum blade against the side walls of the scum baffle.

Another object of the present invention is to provide a surface skimming discharge system having a scum beach and trough assembly and a scum blade and pocket assembly which positively seals the scum blade against the scum beach during discharge.

These and other objects are realized in accordance with the present invention by providing a surface skimming system which in its simplest form includes a rotating skimming arm, a scum blade and pocket assembly, and a scum baffle. The skimming arm sweeps the surface of the clarifier pushing the floating matter ahead of it. The scum blade and pocket assembly is secured to the outer end of the skimming arm for receiving and directing the outwardly moving floating matter into the scum baffle. The scum baffle is located adjacent the outer periphery of the clarifier tank and includes a scum beach and trough assembly to receive the floating matter collected in the scum pocket. A pair of scum blades are positioned adjacent one another in an overlapping relationship and are independently biased against the side walls of the scum baffle by flexible support members. The flexible support members are in turn secured to the skimmer arm through a torsion bar so as to permit vertical movement of the scum blades while maintaining a downward bias thereon as they move along the scum beach.

BRIEF DESCRIPTION OF THE DRAWINGS

Other objects and many of the attendant advantages of the present invention will be readily appreciated as the same becomes better understood by reference to the following detailed description, when considered in connection with the accompanying drawings, in which like reference numerals designate like parts throughout the figures thereof and wherein.

FIG. 2 is a perspective view of the discharge portion of the surface skimming system as shown in FIG. 1.

DESCRIPTION OF A PREFERRED EMBODIMENT

Figure 1:
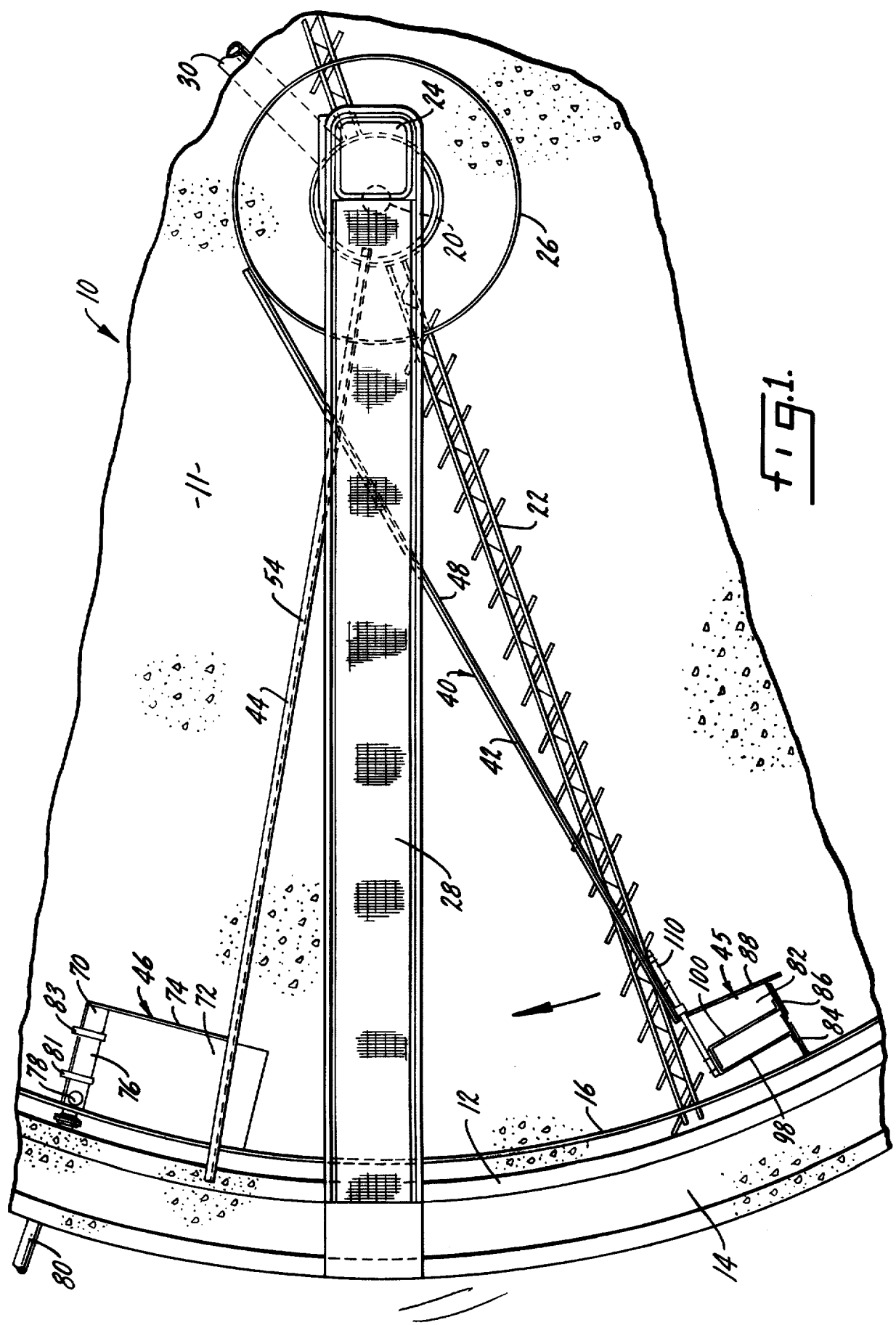
FIG. 1 is a fragmentary plan view of a typical clarifier tank incorporating the surface skimming system of the present invention.

Referring to FIG. 1, a portion of a sewage treatment clarifier is illustrated generally at 10. The clarifier 10 includes a tank 11, having a generally circular cylindrical outer wall 12, which is provided with an effluent trough 14 and a scum baffle 16, both of which are of well known construction. The effluent trough 14 slopes to an outlet pipe (not shown) for removal of clarified liquid from tank 11. From the center of the tank bottom, there rises a drive shaft 20 supporting a sludge scraper assembly 22 of conventional construction for rotation therewith. A drive assembly 24 is connected to shaft 20 in a well known manner to rotate shaft 20 and sludge scraper assembly 22. A stilling well assembly 26 is secured to shaft 20 at an upper portion thereof for rotation therewith. A walkway 28 extends across the upper edge of tank 11 to permit access to the center of tank 11 and to support the drive assembly 24 thereabove. A clarifier inlet pipe 30 supplies raw wastewater or mixed liquor into stilling well assembly 26.

In operation, wastewater or sewage, which has been aerated and mixed with activated sludge, enters the stilling well assembly 26 through inlet pipe 30 and flows into tank 11. In tank 11, the solid material, or sludge, settles to the bottom of the tank 11 where it is removed therefrom in a conventional manner. The liquid in the clarifier, free of settleable solids, overflows into the effluent trough 14 and is removed therefrom through an outlet pipe. The sludge removed from the clarifier is conditioned for future mixture with incoming wastewater or sewage.

As the solids settle in the clarifier tank 11, very light solids tend to float to the top of the liquid and form a scum on its surface. This scum must be collected from the liquid surface and discharged from the tank to prevent its contamination of the clarifier effluent and to remove the unsightly and smelly mess for environmental reasons. Scum baffle 16, of well known construction, prevents the scum from entering the effluent trough 14, but does not eliminate accumulated layers of scum on the surface of the liquid. For this purpose, a surface skimming system, indicated generally at 40, is provided. Surface skimming system 40 includes a surface skimming rotating arm 42, a fixed anti-rotation arm 44, a scum blade and pocket assembly 45, and a scum collection assembly 46.

Surface skimming arm 42 is formed from an angle iron member 48 which extends tangentially outward from stilling well 26 to a point just short of baffle 16. Anti-rotation arm 44 includes an angle iron member 54 which extends radially outward from stilling well 26 to a point just short of baffle 16 at an elevation above the elevation of member 48. Member 54 is rigidly supported from walkway 28 by a suitable supporting structure (not shown). Anti-rotation arm 44 also includes a flexible bottom strip 62 made from a flexible material such as rubber, which is sandwiched along its upper edge between the vertical leg of member 54 and a plate 64. Strip 62 extends downward to an elevation below the upper edge of skimming arm 42.

Scum collection assembly 46 extends inwardly from baffle 16 and includes a scum trough 70 and a scum beach plate 72 defined between baffle 16 and a side member 74. Scum beach 72 is inclined upward toward and terminates at the upper edge of scum trough 70. The bottom surface 76 of scum trough 70 is inclined downward and outward towards baffle 16 and includes an opening 78 adjacent the outer end thereof for communication with a conventional scum drawoff pipe assembly 80 for removal of the scum collected in trough 70. A pair of guide rails 81 and 83 span across the upper edges of trough 70.

The heart of the present invention lies in the construction of the scum blade and pocket assembly 45 and its cooperation with the scum collection assembly 46. A scum pocket 82 is defined at the end of surface skimming arm 42 between a pair of scum blades 84 and 86, a scum pocket side plate 88 and baffle wall 16. Side plate 88 is preferably secured to the outer end of angle iron member 48. Scum blades 84 and 86 are positioned relative to one another in a sliding, overlapping relationship. The blades 84 and 86 respectively include plates 90 and 92 which support and provide the necessary rigidity to flexible sealing belts 94 and 96. Sealing belts 94 and 96 are preferably made from a neoprene material which permits the overlapping edges thereof to slide relative to one another and the opposite edges and the bottom edges to slide and seal against baffle 16, side plates 74 and 88 and scum beach plate 72.

Blades 84 and 86 are respectively supported by support members 98 and 100 which serve as leaf springs to urge the sealing belts 94 and 96 into sealing contact against the baffle 16 and the side plates 74 and 88. Support members 98 and 100 respectively include flange portions 102 and 104 which are bolted to plates 90 and 92 and flange portions 106 and 108 which overlap one another and are respectively secured together. Support members 98 and 100 are secured by a torque tube or torsion bar assembly 110, of well known construction, which in turn is secured to surface skimming arm 42. The outer end of torsion bar assembly 110 is rigidly secured to flange portions 106 and 108 by a pair of U-bolts 112. The inner end of assembly 110 is rigidly secured to a connection plate 114 by a U-bolt 116 which in turn is rigidly secured to angle iron 48. Torsion bar assembly 110 is effective to permit blades 84 and 86 and support members 98 and 100 to pivot upward about a horizontal axis against a downward bias in the assembly 110.

In operation, the rotating arm 42 sweeps the surface of the liquid in tank 11 in the direction indicated by the arrow in FIG. 1, pushing the floating matter ahead of it. As arm 42 approaches the fixed anti-rotation arm 44, a wedge is formed therebetween which traps the floating matter. As arm 42 continues to rotate, the wedge is made smaller and simultaneously moves outward, directing the floating matter into scum pocket 82. Arm 42 and scum pocket 82 continue to rotate and the collected floating matter or scum is carried in the scum pocket 82. The two corners of pocket 82 are independently sealed by the skimmer blades 84 and 86. The sealing belt 94 of blade 84 is forced against baffle wall 16 by the bias of flexible support member 98. The sealing belt 96 is forced against scum pocket side plate 88 by the bias of flexible support member 100. These two sealing actions are independent by virtue of the sliding joint where the blades overlap.

As the arm 42 and pocket 82 approach the scum beach 72, the side member 74 passes inside pocket 82 and separates the side plate 88 from the skimmer blade 100 which has been sealing on it, and a seal is formed between side member 74 and sealing belt 96. Also, as the skimmer blades 84 and 86 advance, they contact the sloping scum beach 72 trapping the floating scum in pocket 82 on the scum beach 72. The blades 84 and 86 continue to rise causing the torsion bar assembly 110 to be twisted and exert a torque, which in turn exerts a downward force on the skimmer blades 84 and 86. This downward force seals the lower edges of sealing belts 94 and 96 against the scum beach 72. A complete seal has thus been formed and the scum, plus a quantity of flushing water is trapped and will be discharged as the skimmer blades 84 and 86 pass over the scum trough 70 and guide rails 81 and 83. After the blades 84 and 86 pass the scum trough 70, the seal between the scum pocket side plate 88 and the skimmer blade 86 is again formed and the system begins collecting scum again. The scum and the flushing water flow down towards opening 78 in trough 70 and are removed via scum drawoff pipe assembly 80 in a well known manner.

The surface skimming system as hereinbelow disclosed provides a positive and reliable discharge of floating matter from a circular clarifier tank and is lightweight and simple to construct and operate. The system of the present invention features independent sealing action of the skimmer blade ends, which is made possible by the unique use of two independent skimmer blades with a sliding joint where they overlap. The system also features a positive seal of the skimmer blades on the beach during discharge, produced by torque from the torsion bar assembly. Both features are accomplished by simple, lightweight and economical mechanisms, which perform better and more reliably than existing complex, heavy and expensive systems.

The present invention is disclosed in combination with a surface skimming system which includes an anti-rotation arm to more positively direct the collected floating matter into the scum pocket. However, the present invention is also contemplated for use with the more conventional systems which do not include anti-rotation arms. Obviously many modifications and variations of the present invention are possible in light of the above teachings. It is, therefore, to be understood that, within the scope of the appended claims, the invention may be practiced otherwise than as specifically described.

What is claimed is:

1. In combination with a circular tank adapted to receive liquid, means for removing floating matter from the surface of the liquid, said means comprising:
  a. a surface skimming arm positioned within said tank for rotation about a centrally disposed vertical axis so as to push the floating matter ahead of it; and
  b. a scum pocket means secured to and carried by the outer end of said surface skimming arm for receiving and directing said floating matter into a scum collection assembly positioned adjacent the outer periphery of said tank, said scum pocket means being defined by a first inner side member secured to said skimming arm, an outer side member rigidly affixed within said tank, and a pair of skimmer blade means extending between and independently biased to seal against said first inner side member and said outer side member.

2. The invention as defined in claim 1 wherein said skimmer blade means are positioned adjacent one another in an overlapping relationship and flexible support member means are provided for independently securing said skimmer blade means to said surface skimming arm while maintaining said bias on said respective blade means towards said first inner side member and said outer side member.

3. The invention as defined in claim 2 wherein said scum collection assembly includes a second inner side member and said outer side member, a scum beach member which angles upward in the direction of movement of said skimmer blade means and a scum trough which drops down below the upper edge of said scum beach member.

4. The invention as defined in claim 3 wherein said support member means are pivotally secured about a substantially horizontal axis to said surface skimming arm so as to permit vertical movement of said skimmer blade means as they move along said scum beach member.

5. The invention as defined in claim 3 wherein said support member means are secured to a torsion bar member which in turn is secured to said skimming arm so as to permit vertical movement of said skimmer blade means while maintaining a downward bias thereon as they move along said scum beach member.

6. In combination with a circular tank adapted to receive liquid, means for removing floating matter from the surface of the liquid, said means comprising:
  a. a surface skimming arm positioned within said tank for rotation about a centrally disposed vertical axis so as to push the floating matter ahead of it;
  b. an anti-rotation arm rigidly affixed within said tank, said skimming arm and said anti-rotation arm form a wedge therebetween which becomes smaller and moves outward as said skimming arm approaching said anti-rotation arm; and
  c. a scum pocket means secured to and carried by the outer end of said surface skimming arm for receiving and directing the outwardly moving floating matter into a scum collection assembly positioned adjacent the outer periphery of said tank, said scum pocket means being defined by a first inner side member secured to said skimming arm, an outer side member rigidly affixed within said tank, and a pair of skimmer blade means extending between and independently biased to seal against said inner side member and said outer side member.

7. The invention as defined in claim 6 wherein said skimmer blade means are positioned adjacent one another in an overlapping relationship and flexible support member means are provided for independently securing said skimmer blade means to said surface skimming arm while maintaining said bias on said respective blade means towards said first inner side member and said outer side member.

8. The invention as defined in claim 7 wherein said flexible support members act as leaf springs and have first ends secured to said corresponding skimmer blade members and second ends secured to each other.

9. The invention as defined in claim 8 wherein said scum collection assembly includes a second inner side member and said outer side member, a scum beach member which angles upward in the direction of movement of said skimmer blade means and a scum trough which drops down below the upper edge of said scum beach member.

10. The invention as defined in claim 9 wherein said second ends of said support member means are pivotally secured about a substantially horizontal axis to said surface skimming arm so as to permit vertical movement of said skimmer blade means as they move along said scum beach member.

11. The invention as defined in claim 9 wherein said second ends of said support member means are secured to a torsion bar member which in turn is secured to said skimming arm so as to permit vertical movement of said skimmer blade means while maintaining a downward bias thereon as they move along said scum beach member.

12. The invention as defined in claim 9 wherein the bottom surface of said scum trough slopes downward and outward towards the outer periphery of said tank so as to direct the material collected therein towards a discharge pipe in communication with said bottom surface adjacent said outer periphery of said tank.

13. The invention as defined in claim 12 wherein at least one guide rail extends across the top of said scum trough for guiding said skimmer blades thereacross.

* * * * *